United States Patent
Tsuchiya et al.

(10) Patent No.: US 7,576,818 B2
(45) Date of Patent: Aug. 18, 2009

(54) LIQUID CRYSTAL DISPLAY DEVICE AND ELECTRONIC APPARATUS

(75) Inventors: Hitoshi Tsuchiya, Suwa (JP); Toshiharu Matsushima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 626 days.

(21) Appl. No.: 11/490,055

(22) Filed: Jul. 21, 2006

(65) Prior Publication Data

US 2006/0256266 A1   Nov. 16, 2006

Related U.S. Application Data (62) Division of application No. 10/736,598, filed on Dec. 17, 2003, now Pat. No. 7,102,714.

(30) Foreign Application Priority Data

Dec. 25, 2002 (JP) .............................. 2002-373965
Nov. 17, 2003 (JP) .............................. 2003-386786

(51) Int. Cl.
G02F 1/1335 (2006.01)

(52) U.S. Cl. ..................................... 349/114

(58) Field of Classification Search ............... None
See application file for complete search history.

(56) References Cited

U.S. PATENT DOCUMENTS

| | | | |
|---|---|---|---|
| 6,281,952 B1 | 8/2001 | Okamoto et al. | |
| 6,788,375 B2 | 9/2004 | Ogishima et al. | |
| 6,989,874 B2 * | 1/2006 | Chae | 349/95 |
| 7,215,393 B2 * | 5/2007 | Kawaguri et al. | 349/113 |
| 2003/0048399 A1 * | 3/2003 | Okumura | 349/113 |
| 2003/0076464 A1 | 4/2003 | Ozawa et al. | |
| 2004/0061817 A1 | 4/2004 | Maeda | |

FOREIGN PATENT DOCUMENTS

| | | |
|---|---|---|
| JP | A-07-064089 | 3/1995 |
| JP | A-11-242226 | 9/1999 |
| JP | A-11-305237 | 11/1999 |
| JP | A-2002-350853 | 12/2002 |

OTHER PUBLICATIONS

Jisaki et al., "Development of transflective LCD for high contrast and wide viewing angle by using homeotropic alignment", *Asia Display*, IDW '01 (2001), pp. 133-136.

* cited by examiner

*Primary Examiner*—Timothy Rude
(74) *Attorney, Agent, or Firm*—Oliff & Berridge, PLC

(57) ABSTRACT

To provide a transflective liquid crystal display device capable of obtaining a display with a high brightness, a high contrast, and a wide viewing angle, a vertical alignment mode using liquid crystal layer whose initial alignment state represents a vertical alignment is utilized, the reflective display region is provided to surround the periphery of the transmissive display region within a single dot region, and an insulating film for regulating the thickness of the liquid crystal layer is provided in a region corresponding to the reflective display region R in the periphery of the dot. In addition, in the substrate (counter substrate) opposite to the side where the insulating film is formed, an opening is provided in a common electrode at a position corresponding to the boundary between the reflective display region and the transmissive display region.

6 Claims, 10 Drawing Sheets

LIQUID CRYSTAL DISPLAY DEVICE AND ELECTRONIC APPARATUS

CROSS-REFERENCE TO RELATED APPLICATION

This is a Divisional of application Ser. No. 10/736,598 filed Dec. 17, 2003. This application claims the benefit of Japanese Patent Application Nos. 2002-373965, filed Dec. 25, 2002, and Japanese Patent Application No. 2003-386786, filed Nov. 17, 2003. The disclosures of the prior applications are incorporated by reference herein in their entirety.

BACKGROUND OF THE INVENTION

1. Field of Invention

The present invention relates to a liquid crystal display device and an electronic apparatus, and more specifically, to a transflective liquid crystal display device having both transmissive and reflective modes capable of obtaining a high contrast and a wide viewing angle.

2. Description of Related Art

A related art liquid crystal display device has been proposed where external light is used in a bright place similar to a reflective display and where an internal light source, such as a backlight, is used in a dark place to make the display visible. That is, this liquid crystal display device employs a display mode with both reflective and transmissive types, and is configured so as to reduce its power consumption by altering the display mode to one of the reflective and transmissive modes depending on the brightness of its surroundings, and can obtain a clear display even in dark surroundings, and is therefore suitable for a display for a portable apparatus. Hereinafter, such a liquid crystal display device is referred to as "a transflective liquid crystal display device" in the present specification.

As such a transflective liquid crystal display device, a related art liquid crystal display device has been proposed in which a liquid crystal layer is interposed between an upper substrate and a lower substrate and also a reflective film, in which an opening for light transmission is formed in a metal film, such as aluminum, is provided on the inner side of the lower substrate so as to function as a transflector. At this time, in the reflective mode, external light enters from the upper substrate and passes through a liquid crystal layer and then reflects on a reflective film of the inner side of the lower substrate and then passes through the liquid crystal layer again and then emits from the upper substrate, thereby contributing to display. However, in the transmissive mode, light from a backlight enters from a lower substrate and passes through a liquid crystal layer from the opening of the reflective film and then emits from the upper substrate to the outside, thereby contributing to the display. Therefore, in the forming region of the reflective film, the region in which an opening is formed is a transmissive display region, and the remaining region is a reflective display region.

However, the above transflective liquid crystal display device has a problem in that the viewing angle is narrow in the transmissive display. This is because the reflective display is to be performed only with a single sheet of polarizer which is provided on the observer side, since a transflector is provided on the inner plane of a liquid crystal cell so that parallax does not occur, thereby reducing the degree of freedom in the optical design. In order to address this problem, Jisaki et al. has proposed a novel transflective liquid crystal display device using a vertical alignment liquid crystal in "Development of transflective LCD for a high contrast and a wide viewing angle by using homeotropic alignment", M. Jisaki et al., Asia Display/IDW'01, p. 133-136 (2001). Its characteristics are as follows:

(1) "A VA (Vertical Alignment) mode" has been employed where a liquid crystal with a negative dielectric anisotropy is aligned vertically to a substrate and is thrown down by the application of voltage.

(2) "A multigap structure" has been employed where a transmissive display region and a reflective display region are different in liquid crystal layer thickness (cell gap) from each other (see Japanese Unexamined Patent Application Publication No. 11-242226 in this regard).

(3) A transmissive display region is a regular octagon, and a protrusion is provided in the center of the transmissive display region on the counter substrate so that the liquid crystal is thrown down in eight directions within this region. In other words, "alignment division structure" has been employed.

SUMMARY OF THE INVENTION

According to the liquid crystal display device in the treatise disclosed by Jisaki et al., a protrusion is provided in the center of a transmissive display region and then the alignment direction of liquid crystal is controlled. However, in application, such as portable apparatus and the like, a display which is brighter and has a high contrast is demanded, so transmissive display tends to be more essential than reflective display. Under the circumstances, the area occupied by a transmissive display region has been increasing within a single dot. In this case, a problem has arisen in that since there is a chance not to completely perform the alignment control only with a protrusion provided in the center of a transmissive display region, like the configuration described in the above-mentioned treatise, display defects, such as residual image resulting from an alignment disorder called disclination, are caused.

The present invention is directed to address such a problem. Accordingly, the present invention provides a transflective liquid crystal display device in which display defects, such as residual image and the like, do not occur and further to provide a liquid crystal display device capable of obtaining a high brightness and a high contrast.

In order to achieve the above, an aspect of the present invention is characterized by a liquid crystal display device, a liquid crystal layer being interposed between a pair of substrates and in which a transmissive display region for transmissive display and a reflective display region for reflective display are provided within a single dot region, the liquid crystal layer being formed of liquid crystal with a negative dielectric anisotropy whose initial alignment state represents a vertical alignment, a thickness-adjusting layer of a liquid crystal layer, which makes the thickness of the liquid crystal layer different in the reflective display region and the transmissive display region, being provided in at least the reflective display region between at least one of the pair of substrates and the liquid crystal layer, and the thickness-adjusting layer of the liquid crystal layer having an inclined plane in the vicinity of the boundary between the reflective display region and the transmissive display region so that its thickness can vary continuously, and electrodes are provided on the inner sides of each of the pair of substrates respectively, with an opening being provided at a position corresponding to the inclined plane of the thickness-adjusting layer of the liquid crystal layer in the electrode on the substrate opposite to the side where the thickness-adjusting layer of the liquid crystal layer is provided among the electrodes on the pair of substrates. At this time, "an opening is provided at a position corresponding to the inclined plane of the thickness-adjusting layer of the liquid crystal layer" as described above refers to "an opening is provided to overlap at least the portion of the inclined plane of the thickness-adjusting layer of the liquid crystal layer in plan view".

A liquid crystal display device according to an aspect of the present invention is configured by combining a transflective liquid crystal display device with liquid crystal of a vertical alignment mode. Recently, in order to deal with the contrast deterioration resulting from the retardation difference in both the reflective and transmissive display modes, a transflective liquid crystal display device has been proposed having a structure in which a reflective display region and a transmissive display region are different in liquid crystal layer thickness from each other, for example, by being formed so that an insulating film with a predetermined thickness within a reflective display region on a lower substrate protrudes toward the liquid crystal layer (see Japanese Unexamined Patent Application Publication No. 11-242226). The present applicant also has made numerous applications for the inventions concerning such a liquid crystal display device. According to this configuration, since a reflective display region can be made thinner than a transmissive display region in liquid crystal layer thickness by an insulating film (the insulating film to perform such a function is referred to as "a thickness-adjusting layer of a liquid crystal layer" in the present specification), it is possible to make the retardation contributing to reflective display satisfactorily approximate or roughly equal to the retardation contributing to transmissive display, thereby enhancing contrast.

In the above-mentioned inventions, the present inventors have found a method to control the alignment direction in applying an electrical field in the liquid crystal of a vertical alignment mode by combining a liquid crystal display device having the above-mentioned insulating film with a liquid crystal layer of a vertical alignment mode. That is, the liquid crystal with a negative dielectric anisotropy (negative-type liquid crystal) is generally used when employing a vertical alignment mode, however, since a liquid crystal molecule standing vertically to a substrate plane in an initial alignment state is thrown down by the application of voltage, if anything is not contrived (if a pretilt angle is not given), the direction to which the liquid crystal molecule will be thrown down can not be controlled and display defects may occur due to alignment disorder (disclination), thereby resulting in display deterioration. On this account, when using the vertical alignment mode, it is important to control the alignment direction of the liquid crystal molecule in applying an electrical field. In the liquid crystal display device having a thickness-adjusting layer of a liquid crystal layer, since the thickness-adjusting layer of a liquid crystal layer protrudes toward a liquid crystal layer and also has an inclined plane that allows its thickness to vary continuously, the liquid crystal molecule stands vertically to the inclined plane and has a pretilt angle corresponding to the tilt angle of the inclined plane.

However, it is not necessarily possible to satisfactorily control the alignment for lack of the capacity to control the alignment only by the inclined plane of the thickness-adjusting layer of a liquid crystal layer. As a result, the present inventors have contrived to provide an opening on a position corresponding to the inclined plane (a position which overlaps with the inclined plane in plan view) in an electrode on the substrate opposite the thickness-adjusting layer of a liquid crystal layer. Since the electrical field (potential line) generated between the electrodes on both substrates slants in the vicinity of the opening due to the opening provided in the electrode, the slanted electrical field facilitates the control of the alignment of liquid crystal all the more. According to the configuration of an aspect of the present invention, since there is an inclined plane of the thickness-adjusting layer of a liquid crystal layer in the boundary between a transmissive display region and a reflective display region, for example, when a transmissive display region is provided in the center of a single dot region, the periphery of the transmissive display region is surrounded by the inclined plane of the thickness-adjusting layer of a liquid crystal layer. In addition, since an opening of an electrode is provided on a position corresponding to an inclined plane, the periphery of the transmissive display region falls within the scope of the capacity to control the alignment of liquid crystal. Therefore, the alignment is controlled more satisfactorily when compared with the configuration described in the above-mentioned treatise in which only a single protrusion is provided in the center of a transmissive display region, and thus display defects resulting from the disclination are reduced or prevented. As a result, it is possible to provide a liquid crystal display device with a high brightness and a high contrast.

In addition, since the substrate on the opposite side of the thickness-adjusting layer of the liquid crystal layer is flatter when compared with the substrate on the side of the thickness-adjusting layer of the liquid crystal layer, it is possible to reduce or prevent defects, such as disconnection, in a conductive portion that may occur when an opening is provided in an electrode. Moreover, for example, in the case of the configuration where a rectangular transmissive display region is provided in the center of a pixel, when a slit-shaped rectangular opening is provided in the boundary between a reflective display region and a transmissive display region, alignment directions of liquid crystal molecules are determined to be in four directions perpendicular to each side of the rectangle. As a result, since the region with four different alignment directions is created within a single dot region, an alignment division structure can be realized, thereby obtaining a wide viewing angle.

In the configuration of an aspect of the present invention, it has been so far described that the alignment direction of liquid crystal is controlled by the slanted electrical field by providing an opening in an electrode. On the other hand, when a convex portion (protrusion) is provided on an electrode, the alignment direction of liquid crystal can be controlled by the protrusion projected into a liquid crystal layer.

Although the mechanisms are different from each other, both "an opening in an electrode" and "a protrusion on an electrode" can be utilized to control the alignment direction of liquid crystal molecule. Therefore, in the configuration of the above-mentioned liquid crystal display device according to an aspect of the present invention, the opening in an electrode may be substituted with the protrusion formed of a dielectric formed on an electrode.

For example, another liquid crystal display device according to an aspect of the present invention is characterized in that a liquid crystal display device in which a liquid crystal layer is interposed between a pair of substrates and in which a transmissive display region for transmissive display and a reflective display region for reflective display are provided within a single dot region, the liquid crystal layer being formed of liquid crystal with a negative dielectric anisotropy whose initial alignment state represents a vertical alignment, a thickness-adjusting layer of the liquid crystal layer, which makes the thickness of the liquid crystal layer in the reflective display region and the transmissive display region, is provided in at least the reflective display region between at least one of the pair of substrates and the liquid crystal layer, and the thickness-adjusting layer of the liquid crystal layer has an inclined plane in the vicinity of the boundary between the reflective display region and the transmissive display region so that its thickness can vary continuously, and electrodes are provided on the inner sides of each of the pair of substrates respectively, with a protrusion being provided at a position corresponding to the inclined plane of the thickness-adjusting layer of the liquid crystal layer in the electrode on the substrate opposite to the side where the thickness-adjusting layer of the liquid crystal layer is provided among the electrodes on the pair of substrates.

Furthermore, another configuration may be employed in which, within a single dot region, a transmissive display region is provided in the center, while a reflective display region is provided to surround the periphery of the transmissive display region. In this case, among the electrodes on the pair of substrates, an opening may be provided at a position substantially corresponding to the center of a transmissive display region in an electrode on the side of the substrate having the thickness-adjusting layer of a liquid crystal layer. Or, a protrusion may be provided on a position substantially corresponding to the center of a transmissive display region on an electrode.

An aspect of the present invention has a configuration that an opening of an electrode or a protrusion formed of dielectric is provided in the substrate on the opposite side of the thickness-adjusting layer of a liquid crystal layer. However, it is preferable that, in addition to such a configuration, an opening or protrusion be provided at a position substantially corresponding to the center of a transmissive display region in the substrate having the thickness-adjusting layer of a liquid crystal layer as well. By doing so, it is possible to increase the capacity to control the alignment in a transmissive display region, thus enhancing the display quality, such as contrast or the like.

An aspect of the present invention may employ the configuration in which color filters are provided on the inner side of any one of the pair of substrates.

According to such a configuration, it is possible to realize a color display with less or no display defects, such as light leakage, and with a high contrast and a wide viewing angle.

Moreover, it is possible to satisfactorily practice both reflective display and transmissive display by including substantially circular polarized light incidence device to make substantially circular polarized light incident on each of the pair of substrates.

An electronic apparatus according to an aspect of the present invention is characterized by including a liquid crystal display device according to an aspect of the present invention.

According to such a configuration, it is possible to provide an electronic apparatus having the liquid crystal display portion with a high brightness, a high contrast and a wide viewing angle, regardless of the usage environment.

DETAILED DESCRIPTION OF EXEMPLARY EMBODIMENTS

First Exemplary Embodiment

Hereinafter, the first exemplary embodiment of the present invention will be described in detail with reference to FIGS. 1 to 3.

A liquid crystal display device according to the present exemplary embodiment is an example of an active matrix liquid crystal display device using a thin film transistor (hereinafter referred to as TFT) as a switching element.

Figure 1:
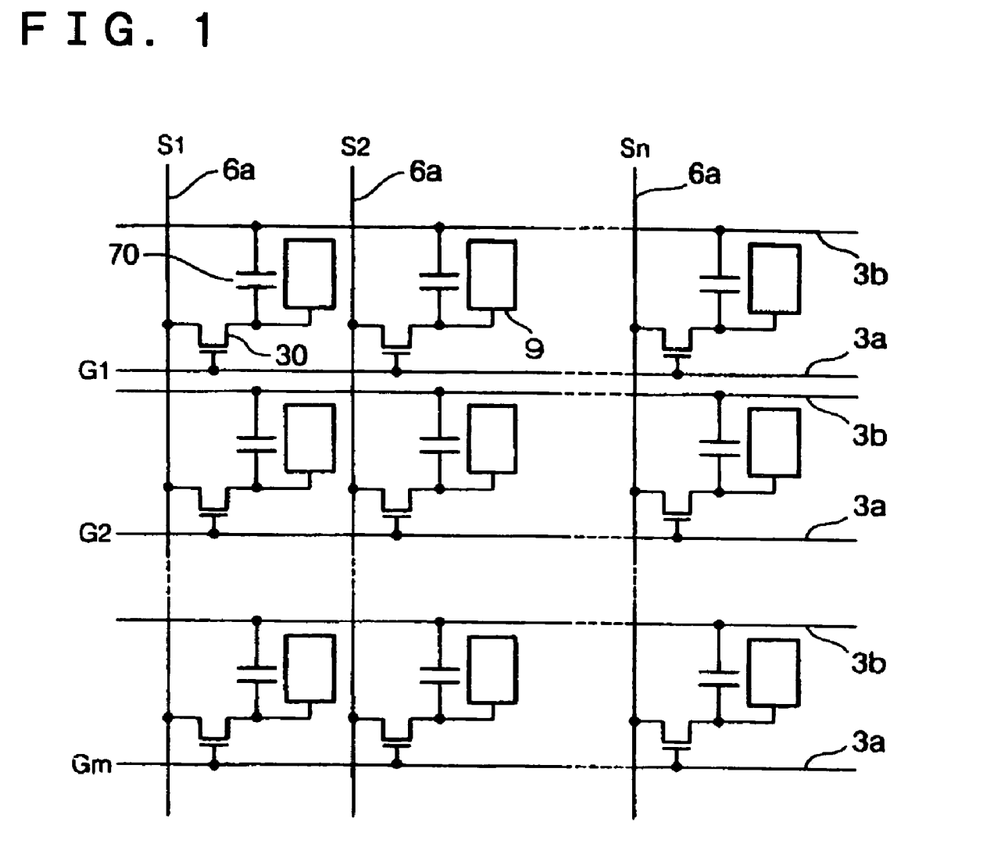
FIG. 1 is an equivalent circuit schematic showing a liquid crystal display device according to the first exemplary embodiment of the present invention.

FIG. 1 is an equivalent circuit schematic showing a plurality of dots arranged in a matrix to form an image display region of a liquid crystal display device according to the present exemplary embodiment. FIG. 2 is a plan view showing the inner structure of dots of a TFT array substrate. FIG. 3 is a sectional view taken along the plane A-A' of FIG. 2 which shows a structure of the above-mentioned liquid crystal display device. In addition, the following figures are drawn on different scales for each layer or member in order to make it possible to recognize each layer or member in each figure.

As shown in FIG. 1, in a liquid crystal display device according to the present exemplary embodiment, pixel electrodes 9 and switching elements, i.e. TFTs 30, to control the pixel electrodes 9 are provided respectively, and data lines 6a, to which image signals are applied, are electrically connected to sources of TFTs 30 in a plurality of dots arranged in a matrix to form an image display region. Image signals S1, S2, . . . , and Sn written into data lines 6a are sequentially applied in the line order, or are applied to a plurality of adjacent data lines 6a by the group. In addition, scan lines 3a are electrically connected to gates of TFTs 30, and scan signals G1, G2, . . . , and Gm are applied in the shape of a pulse to a plurality of scan lines 3a in a line order with a predetermined timing. In addition, pixel electrodes 9 are electrically connected to the drains of TFTs 30, and image signals S1, S2, . . . , and Sn, applied from data lines 6a, are written with a predetermined timing by turning on switching elements, TFTs 30, only for a certain period of time.

Image signals S1, S2, . . . , and Sn with a predetermined level which are written into liquid crystal through the pixel electrodes 9 are retained between the pixel electrode and the following common electrode for a certain period of time. The liquid crystal modulates light and makes gradation display possible by altering the alignment or the order of the molecule group by the applied voltage level. Herein, in order to reduce or prevent the retained image signal from leaking, a storage capacitor 70 is additionally provided in parallel with a liquid crystal capacitor provided between a pixel electrode 9 and a common electrode. In addition, a reference numeral 3*b* denotes a capacitive line.

Next, a planar structure of a TFT array substrate constituting a liquid crystal device according to the present exemplary embodiment is described with reference to FIG. 2.

Figure 2:
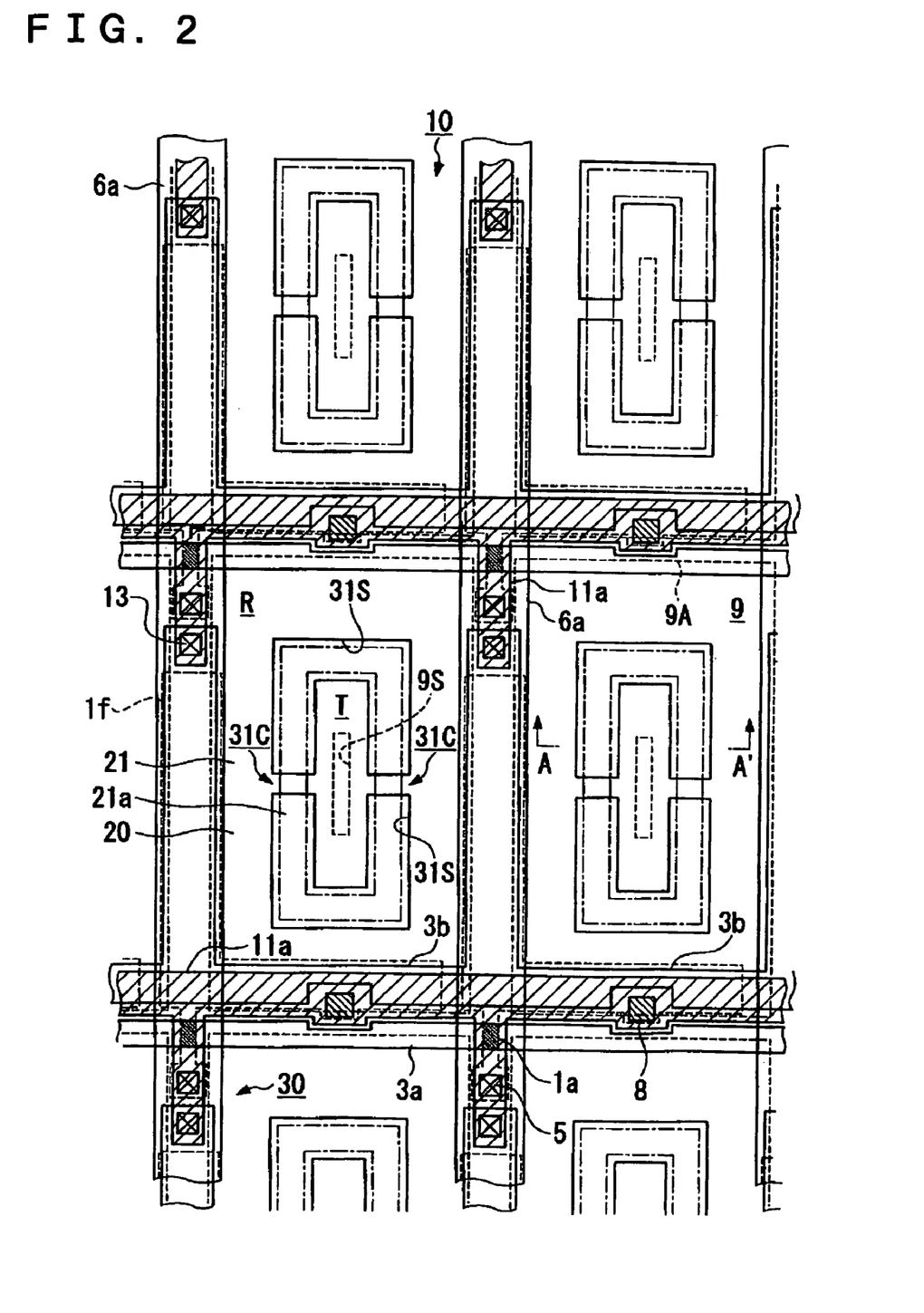
FIG. 2 is a plan view showing the configuration of a single dot of the liquid crystal display device according to the first exemplary embodiment of the present invention.

As shown in FIG. 2, on a TFT array substrate 10, a plurality of rectangular pixel electrodes 9 (the dotted portion 9A denotes its profile) is provided in a matrix, and data lines 6*a*, scan lines 3*a*, and capacitive lines 3*b* are provided along the longitudinal and transverse boundaries of pixel electrodes 9. In the present exemplary embodiment, the inner side of a region where each pixel electrode 9, and each data line 6*a*, each scan line 3*a*, and each capacitive line 3*b* which are disposed so as to surround each pixel electrode 9 are formed becomes a single dot region, and every dot region arranged in a matrix is configured to make display possible.

A data line 6*a* is electrically connected through a contact hole 5 to the following source region of a semiconductor layer 1*a* made of, for example, a polysilicon film constituting a TFT 30, and a pixel electrode 9 is electrically connected through a contact hole 8 to the following drain region of a semiconductor layer 1*a*. In addition, a scan line 3*a* is disposed to face a channel region (a negative sloping line region in the figure) of the semiconductor layer 1*a*, and also functions as a gate electrode in the portion facing the channel region.

A capacitive line 3*b* has a main line portion extending substantially in a straight line along a scan line 3*a* (i.e., a first region provided along a scan line 3*a* in plan view), and a protrusion projected to the front stage (an upward direction in the figure) along a data line 6*a* from the intersection with a data line 6*a* (i.e., a second region provided to extend along a data line 6*a* in plan view). In FIG. 2, a plurality of first light shielding films 11*a* is provided in a positive sloping line region.

More specifically, each of the first light shielding films 11*a* is provided in a position where a TFT 30, including a channel region of a semiconductor layer 1*a*, is covered when seen from a TFT array substrate side, has a main line portion, which is disposed to face a main line portion of a capacitive line 3*b*, extending in a straight line along a scan line 3*a*, and has a protrusion projected to the rear stage (i.e., a downward direction in the figure) adjacent along a data line 6*a* from the intersection with a data line 6*a*. The front-end of the downward protrusion in each stage (pixel row) of the first light shielding film 11*a* overlaps the front-end of the upward protrusion of the capacitive line 3*b* in the next stage below a data line 6*a*.

At the overlapped point, a contact hole 13 to electrically interconnect the first light shielding film 11*a* and the capacitive line 3*b* is provided. That is, in the present exemplary embodiment, the first light shielding film 11*a* is electrically connected through a contact hole 13 to the capacitive line 3*b* of the front or rear stage.

As shown in FIG. 2, a rectangular-frame-shaped reflective film 20 is provided in the periphery of a single dot region, and the region in which the reflective film 20 is provided is a reflective display region R and the region in which the reflective film 20 is not provided is the transmissive display region T. In addition, when seen in plan view, a rectangular insulating film 21 (a thickness-adjusting layer of a liquid crystal layer) is provided so as to include a forming region of a reflective film 20 inside it.

In the case of the present exemplary embodiment, the insulating film 21 has an inclined plane 21*a*, and the inclined plane is defined as the boundary between a reflective display region R and the transmissive display region T in the present specification. A slit-shaped opening 31*s* is provided in the following common electrode 31 on the counter substrate 25 in every dot region, and the planar shape of the opening 31*s* is roughly the shape of a rectangular frame. However, in the case of a completely closed rectangle, the common electrode 31 is separated from the inner and outer sides of the rectangle so that it is difficult to apply voltage to both sides. Therefore, in the case of the present exemplary embodiment, the connecting portions 31*c* of the common electrode 31 are provided on two points on the side of the rectangle. In addition, this connecting portion 31*c* only has to be formed on at least one point. In addition, in the case of the present exemplary embodiment, the width of the opening 31*s* is wider than that of the boundary (the inclined plane 21*a* of the insulating film). On the other hand, a slit-shaped opening 9*s* is provided on a position corresponding to the center of the transmissive display region T of the pixel electrode 9.

Next, a sectional structure of a liquid crystal display device according to the present exemplary embodiment is described with reference to FIG. 3. FIG. 3 is a sectional view taken along the plane A-A' in FIG. 2. A TFT, wire, or the like is not shown and not set forth, since the present invention is characterized by the configuration of an insulating film or an electrode, and the sectional structure of a TFT, wire, or the like is the same as that of the related art.

Figure 3:
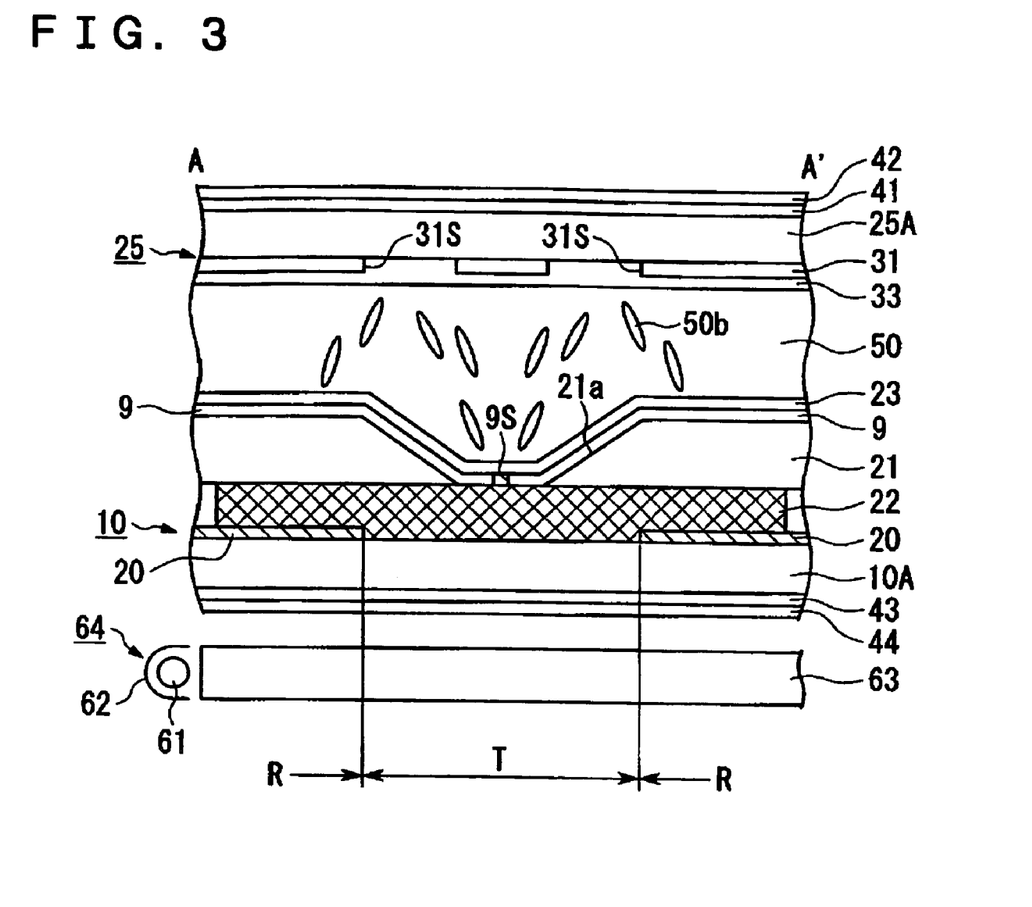
FIG. 3 is a sectional view taken along the plane A-A' of FIG. 2 which shows the liquid crystal display device according to the first exemplary embodiment of the present invention.

As shown in FIG. 3, a liquid crystal layer 50 formed of liquid crystal with a negative dielectric anisotropy whose initial alignment state represents a vertical alignment is interposed between a TFT array substrate 10 and a counter substrate 25 arranged to face the TFT array substrate. On the side of a TFT array substrate 10, a reflective film 20 made of a metal film with a high reflectance, such as Al, Ag, etc. is provided on a surface of a substrate main body 10A made of a transmitting material, such as quartz, glass, etc. As described above, a forming region of a reflective film 20 becomes a reflective display region R, and a non-forming region of a reflective film 20 becomes the transmissive display region T. A colored layer 22 constituting color filters are provided on a reflective film 20 that is disposed in a reflective display region R and also is provided on a substrate main body 10A that is disposed in the transmissive display region T. The colored layers 22 each having different colors, such as red (R), green (G), and blue (B) are arranged in the adjacent dot regions, and a single pixel consists of three adjacent dot regions. Further, in order to compensate for the difference in saturation of display colors between reflective display and transmissive display, a colored layer where purity is changed may be separately provided in a reflective display region R and the transmissive display region T.

An insulating film 21 is provided at a position corresponding to a reflective display region R (the periphery of a dot region) on a colored layer 22 of a color filter. The insulating film 21 is made of, for example, an organic film, such as acrylic resin, with a film thickness of about 2 μm±1 μm, and also has an inclined plane 21*a* so that its layer thickness can vary continuously in the vicinity of the boundary between a reflective display region R and the transmissive display region T. Since a liquid crystal layer 50 is about 2 to 6 μm thick in a portion where there is no an insulating film 21, the liquid crystal layer 50 in the reflective display region R has substantially one-half the thickness of the liquid crystal layer 50 in the transmissive display region T. In other words, the insulating film 21 functions as a thickness-adjusting layer of a liquid crystal layer whose thickness makes the thickness of a liquid crystal layer 50 different in the reflective display region R and the transmissive display region T. In the case of this exemplary embodiment, the edge of a flat plane on the upper side of the insulating film 21 is substantially equal to the edge of a reflective film 20 (a reflective display region), and the inclined plane 21a is included in the transmissive display region T.

A pixel electrode 9 made of a transparent conductive film, such as indium tin oxide (hereinafter referred to as ITO), is provided on a surface of a TFT array substrate 10 including a surface of an insulating film 21. The pixel electrode 9 has a slit-shaped opening 9s in the center of a transmissive display region. An alignment film 23 made of polyimide or the like is formed on the pixel electrode 9.

On the other hand, on the side of the counter substrate 25, a common electrode 31 made of a transparent conductive film, such as ITO, and an alignment film 33 made of polyimide are sequentially formed on a substrate main body 25A made of a transmitting material, such as glass or quartz. As described above, a slit-shaped opening 31s whose planar shape is roughly a shape of a rectangular frame is formed in a common electrode 31, and the opening 31s is disposed over the inclined plane 21a of the insulating film 21. Alignment films 23, 33 on both sides of the TFT array substrate 10 and the counter substrate 25 are subjected to a vertical alignment process, but not subjected to a process to form a pretilt angle, such as rubbing process.

In addition, on the outer sides of both the TFT array substrate 10 and the counter substrate 25, retardation films 43, 41 and polarizers 44, 42 are provided respectively from the substrate main body. Each of the retardation films 43, 41 has a phase difference of about ¼ wavelength for a visible light wavelength, and substantially circular polarized light is incident on a liquid crystal layer 50 from both sides of the TFT array substrate 10 and the counter substrate 25 by the combination of the retardation films 43, 41 and polarizers 44, 42. In addition, on the outer side of a liquid crystal cell corresponding to the outer side of the TFT array substrate 10, a backlight 64 comprising a light source 61, a reflector 62, and a light guide plate 63 is provided.

In accordance with a liquid crystal display device of the present exemplary embodiment, since a liquid crystal layer 50 of the reflective display region R can be made thin so as to be of substantially one-half the thickness of a liquid crystal layer 50 of the transmissive display region T by providing an insulating film 21 in the reflective display region R, it is possible to make a retardation contributing to reflective display substantially equal to a retardation contributing to transmissive display, thereby enhancing contrast. Moreover, since slit-shaped openings 9s, 31s are provided at positions corresponding to the center of the pixel electrode 9 and the boundary of the common electrode 31 respectively, the electrical field applied between the upper and lower electrodes is slanted so that it is possible to control the alignment direction of a liquid crystal molecule 50b by the slanted electrical field. In addition, since liquid crystal molecules 50b within a dot region are thrown down in four directions in applying voltage by the opening 31s of the common electrode 31, it is possible to widen the viewing angle characteristic. As a result, in a liquid crystal display device according to the present exemplary embodiment, it is possible to realize the display with no display defects such as light leakage, and with a high contrast and a wide viewing angle.

Second Exemplary Embodiment

Hereinafter, the second exemplary embodiment according to the present invention is described with reference to FIG. 4.

Figure 4:
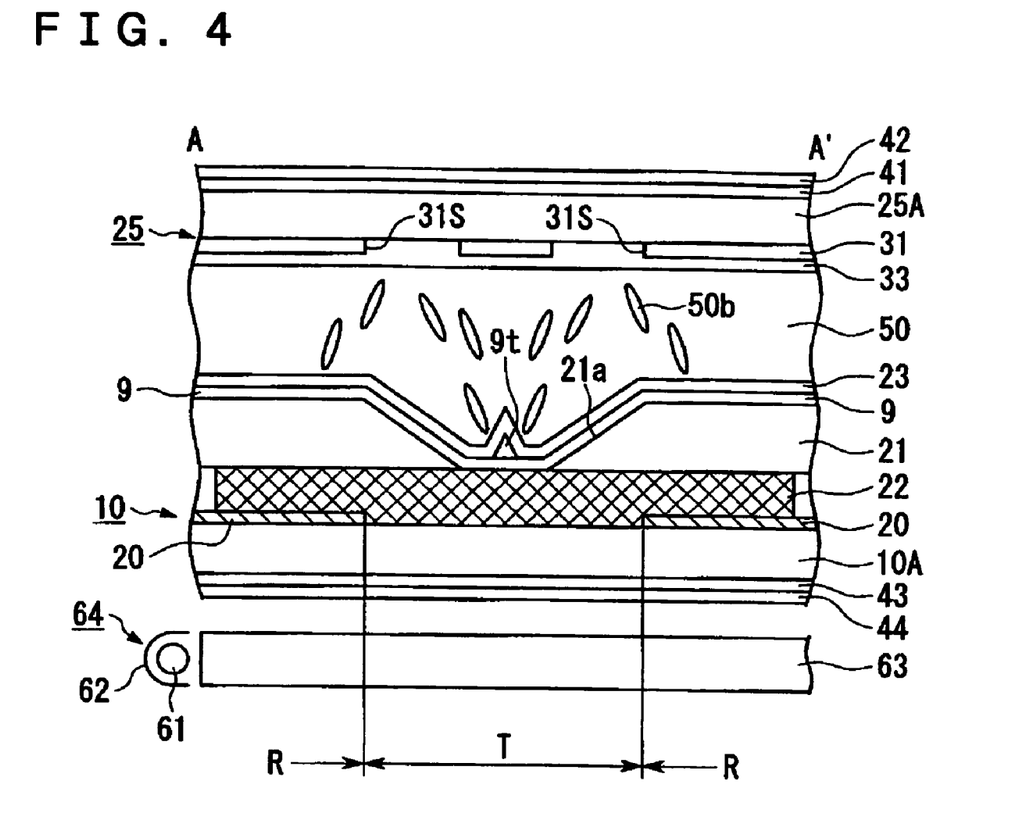
FIG. 4 is a sectional view showing a liquid crystal display device according to the second exemplary embodiment of the present invention.

FIG. 4 is a sectional view showing a liquid crystal display device according to the present exemplary embodiment. Since the primary configuration of the liquid crystal display device of the present exemplary embodiment is exactly the same as that of the first exemplary embodiment, the same components in FIGS. 3 and 4 are indicated by the same reference numerals and are not set forth any more.

In the case of the present exemplary embodiment, as shown in FIG. 4, a protrusion 9t with a triangular section is provided on a pixel electrode 9 on the side of a TFT array substrate 10. This protrusion 9t is made of, for example, dielectric material, such as acrylic resin, and its planar shape is formed in the shape of a straight line in the center of a dot region, like the shape of the opening 9s as shown in FIG. 2 of the first exemplary embodiment. Further, an alignment film 23 is formed to cover the pixel electrode 9 and the protrusion 9t. On the other hand, on the side of the counter substrate 25, a slit-shaped opening 31s whose planar shape is substantially the shape of rectangular frame is provided in the common electrode 31, like the first exemplary embodiment. An opening 31s is disposed over the inclined plane 21a of the insulating film 21.

According to a liquid crystal display device of the present exemplary embodiment, it is possible to control the alignment direction of the liquid crystal molecule 50b by a slanted electrical field resulting from an opening 31s of a common electrode 31 on the side of a counter substrate 25 and also by the shape of a protrusion 9t projected into a liquid crystal layer 50 on a TFT array substrate 10. Thus, it is possible to realize a display with little or no display defects, such as light leakage, and with a high contrast and a wide viewing angle.

Third Exemplary Embodiment

Hereafter, the third exemplary embodiment according to the present invention is described with reference to FIG. 5.

Figure 5:
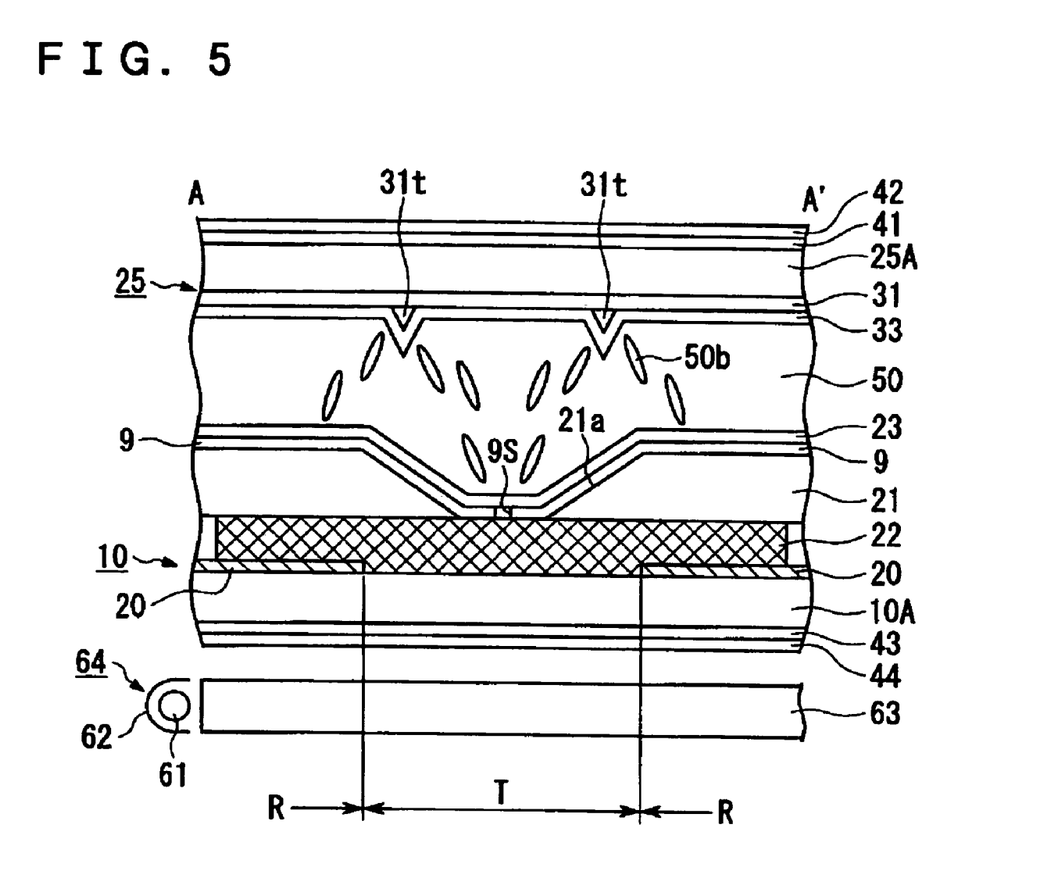
FIG. 5 is a sectional view showing a liquid crystal display device according to the third exemplary embodiment of the present invention.

FIG. 5 is a sectional view showing a liquid crystal display device according to the present exemplary embodiment. Since the primary configuration of the liquid crystal display device of the present embodiment is exactly the same as that of the first exemplary embodiment, the same components in FIGS. 3 and 5 are indicated by the same reference numerals and are not set forth any more.

In the case of the present exemplary embodiment, as shown in FIG. 5, a slit-shaped opening 9s which is a shape of a straight line in plan view is provided in the center of a pixel electrode 9 on the side of a TFT array substrate 10. In addition, an alignment film 23 is provided on a pixel electrode 9. On the other hand, on the side of a counter substrate 25, a protrusion 31t with a triangular section is provided on a common electrode 31. This protrusion 31t is made of, for example, dielectric material, such as acrylic resin, and its planar shape is formed in the shape of rectangular frame completely closed, unlike the opening 31s shown in FIG. 2 of the first exemplary embodiment. The protrusion 31t is disposed over an inclined plane 21a of an insulating film 21, and an alignment film 33 is provided to cover the protrusion 31t and the common electrode 31.

According to a liquid crystal display device of the present exemplary embodiment, it is possible to control the alignment direction of a liquid crystal molecule 50b by the shape of the protrusion 31t projected into the liquid crystal 50 on the side of the counter substrate 25, and also by a slanted electrical field by an opening 9s of a pixel electrode 9 on the side of a TFT array substrate 10. Therefore, it is possible to realize the display with no display defects, such as light leakage, and with a high contrast and a wide viewing angle.

Fourth Exemplary Embodiment

Hereinafter, the fourth exemplary embodiment according to the present invention is described with reference to FIG. 6.

Figure 6:
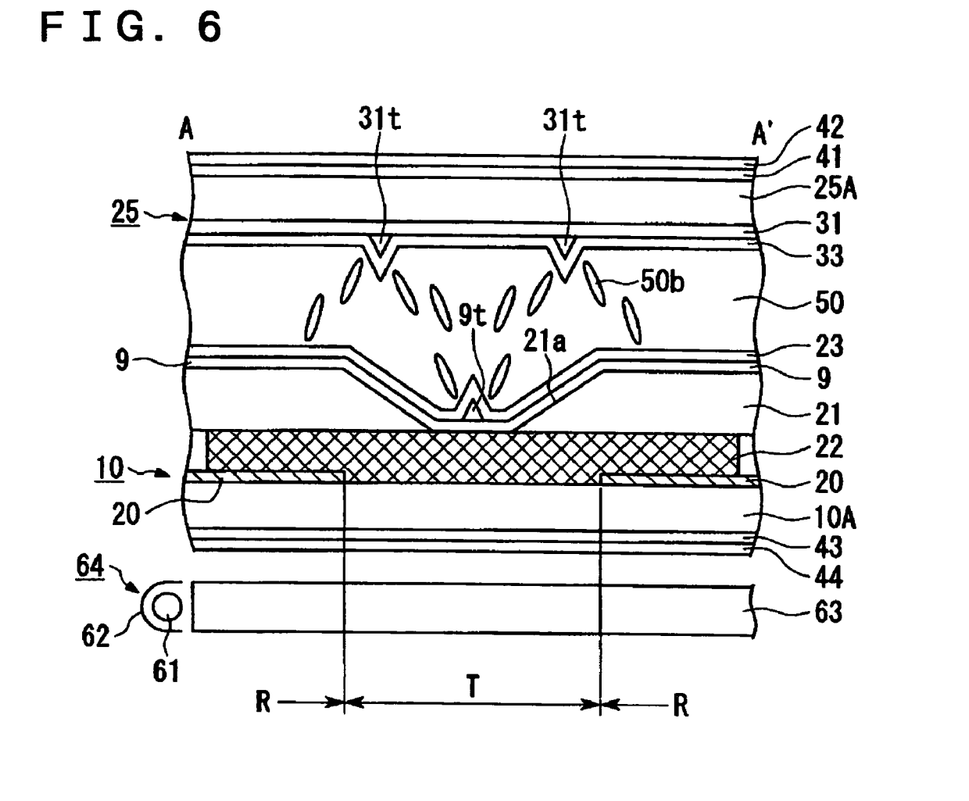
FIG. 6 is a sectional view showing a liquid crystal display device according to the fourth exemplary embodiment of the present invention.

FIG. 6 is a sectional view showing a liquid crystal display device according to the present exemplary embodiment. Since the primary configuration of the liquid crystal display of the present exemplary embodiment is exactly the same as that of the first exemplary embodiment, the same components in FIGS. 3 and 6 are indicated by the same reference numerals and are not set forth any more.

In the case of the present exemplary embodiment, as shown in FIG. 6, a protrusion 9t with a triangular section is provided in the center of a pixel electrode 9 on the side of a TFT array substrate 10. An alignment film 23 is provided to cover the protrusion 9t and the pixel electrode 9. On the other hand, on the side of a counter substrate 25, a protrusion 31t with a triangular section is provided on a common electrode 31. A planar shape of this protrusion 31t is formed in the shape of rectangular frame completely closed and the protrusion 31t is disposed over an inclined plane 21a of an insulating film 21.

According to a liquid crystal display device of the present exemplary embodiment, it is possible to control the alignment direction of the liquid crystal molecule 50b by the shape of the protrusions 9t, 31t projected into the liquid crystal 50 on both sides of the counter substrate 25 and the TFT array substrate 10. Thus, it is possible to realize the display with no display defects such as light leakage, and with a high contrast and a wide viewing angle.

Fifth Exemplary Embodiment

Hereinafter, the fifth exemplary embodiment according to the present invention is described with reference to FIG. 8.

Figure 8:
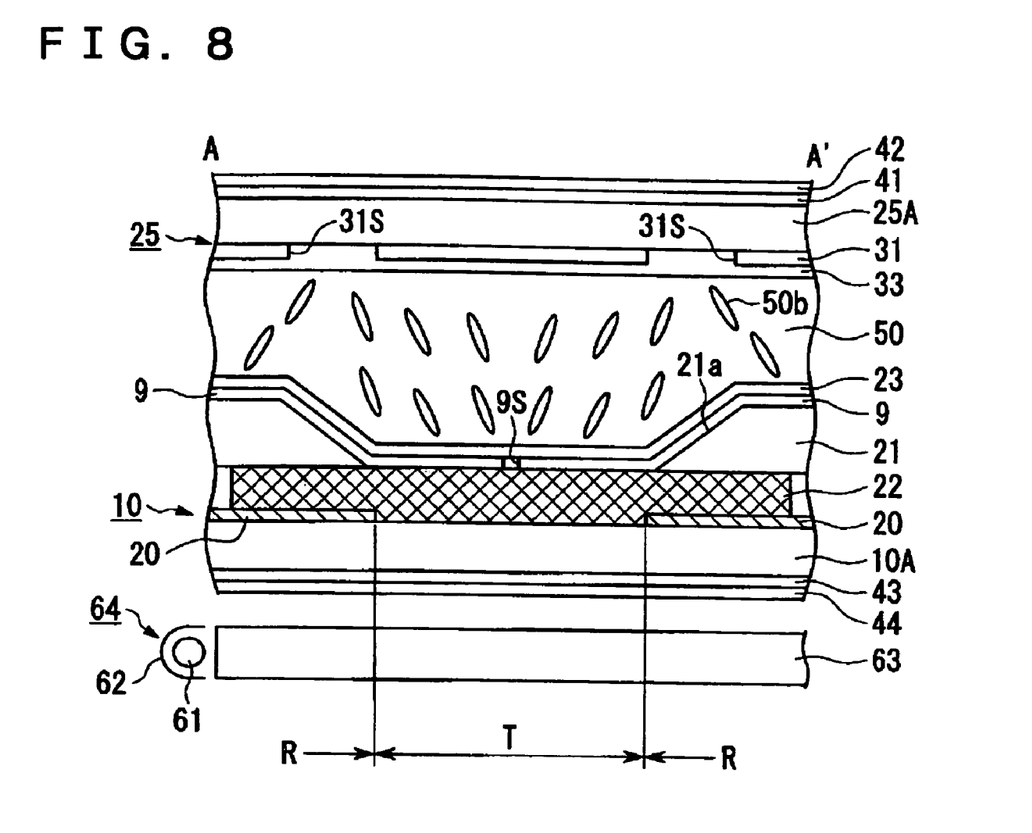
FIG. 8 is a sectional view of a liquid crystal display device according to the fifth exemplary embodiment of the present invention.

FIG. 8 is a sectional view showing a liquid crystal display device according to the present exemplary embodiment. Since the primary configuration of the liquid crystal display device of the present exemplary embodiment is exactly the same as that of the first exemplary embodiment, the same components in FIGS. 3 and 8 are indicated by the same reference numerals and are not set forth any more.

In the case of the present exemplary embodiment, as shown in FIG. 8, the boundary between the transmissive display region T and the reflective display region R, i.e. the outer edge of a reflective film 20, is provided on a lower side of the inclined plane 21a of the insulating film 21. That is, the insulating film 21 is provided so that the bottom of the inclined plane 21a is disposed in the boundary between the transmissive display region T and the reflective display region R, resulting in overlap of the forming region of a reflective film 20 and the forming region of an insulating film 21 in plan view.

An inclined plane may cause an alignment disorder of the liquid crystal molecule in the vicinity of the inclined plane 21a. Generally, in a transflective display capable of performing both transmissive display and reflective display, the transmissive display is higher in luminous efficiency. At this time, display defects, such as contrast deterioration resulting from this alignment disorder, are relatively reduced by forming the inclined plane which may cause the above-mentioned alignment disorder in a region corresponding to the reflective display region R.

Figure 10:
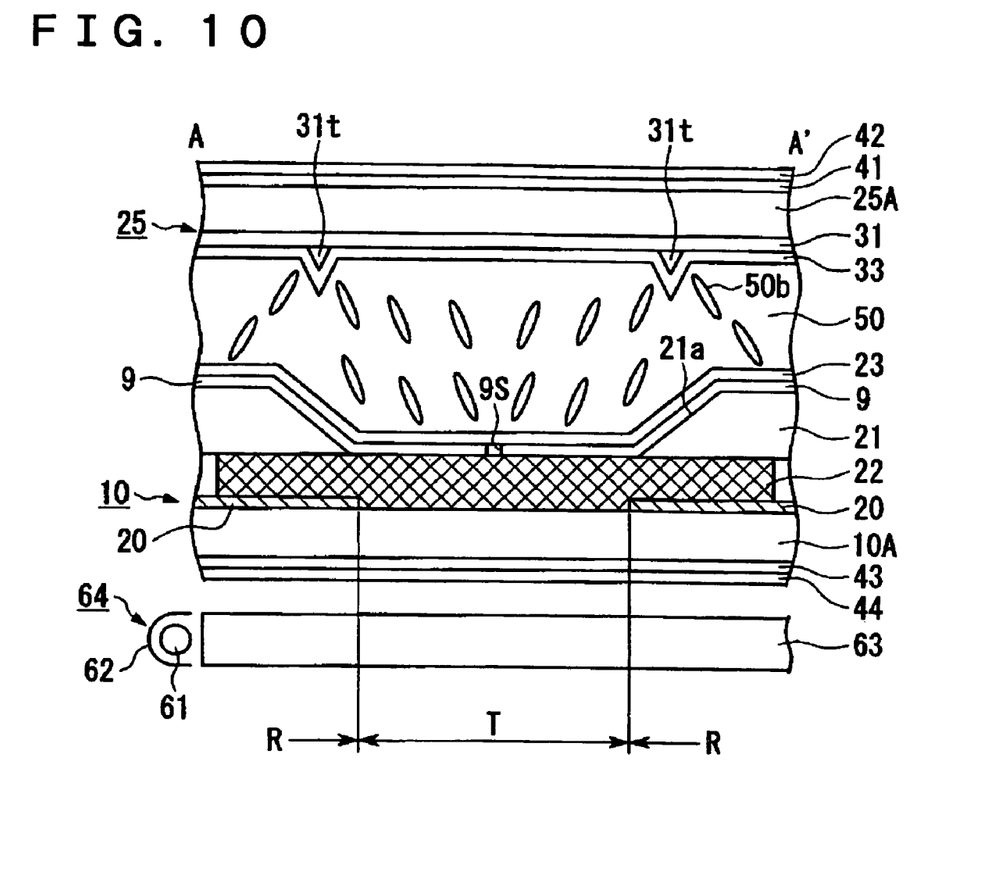
FIG. 10 is a sectional view showing an alternative example of the liquid crystal display device in FIG. 8.

In addition, instead of the opening 31s formed in a common electrode 31 on the side of a counter substrate 25, as shown in FIG. 10, a protrusion 31t projected into a liquid crystal layer 50 from the inner side of the common electrode 31 may be provided. In addition, instead of the opening 9s formed in a pixel electrode 9 on the side of a TFT array substrate 10, a protrusion projected into a liquid crystal layer 50 from the inner side of a pixel electrode 9 may be provided (see FIG. 4). In any case, since the alignment direction of liquid crystal molecule 50b can be controlled by the shape of the protrusion, it is possible to realize the display with no display defects, such as light leakage, and with a high contrast and a wide viewing angle.

Sixth Exemplary Embodiment

Hereinafter, the sixth exemplary embodiment according to the present invention is described with reference to FIG. 9.

Figure 9:
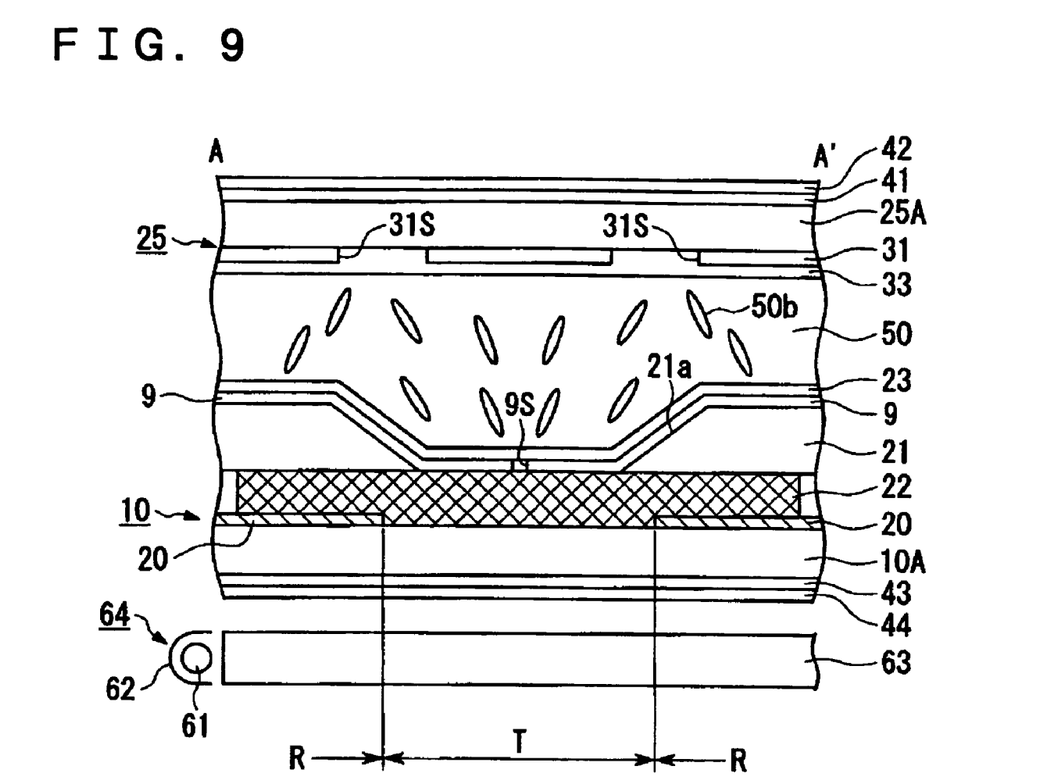
FIG. 9 is a sectional view of a liquid crystal display device according to the sixth exemplary embodiment of the present invention.

FIG. 9 is a sectional view showing a liquid crystal display device according to the present exemplary embodiment. Since the primary configuration of the liquid crystal display device of the present exemplary embodiment is exactly the same as that of the first exemplary embodiment, the same components in FIGS. 3 and 9 are indicated by the same reference numerals and are not set forth any more.

In the case of the present exemplary embodiment, as shown in FIG. 9, the boundary between the transmissive display region T and the reflective display region R, i.e. the outer edge of the reflective film 20, is provided in the middle of the inclined plane 21a of the insulating film 21. More specifically, the insulating film 21 and the reflective film 20 are disposed in the middle of the inclined plane 21a, i.e. in the position that is substantially one-half the height of the insulating film 21 of the reflective display region R so that the outer edge of the reflective film 20 overlaps in plan view.

An inclined plane may cause the alignment disorder of liquid crystal molecule in the vicinity of the inclined plane 21a. At this time, display defects, such as contrast deterioration resulting from this alignment disorder, can be substantially equally shared by both reflective display and transmissive display by forming the inclined plane which may cause the above-mentioned alignment disorder in a region corresponding to the boundary between the reflective display region R and the transmissive display region T.

Figure 11:
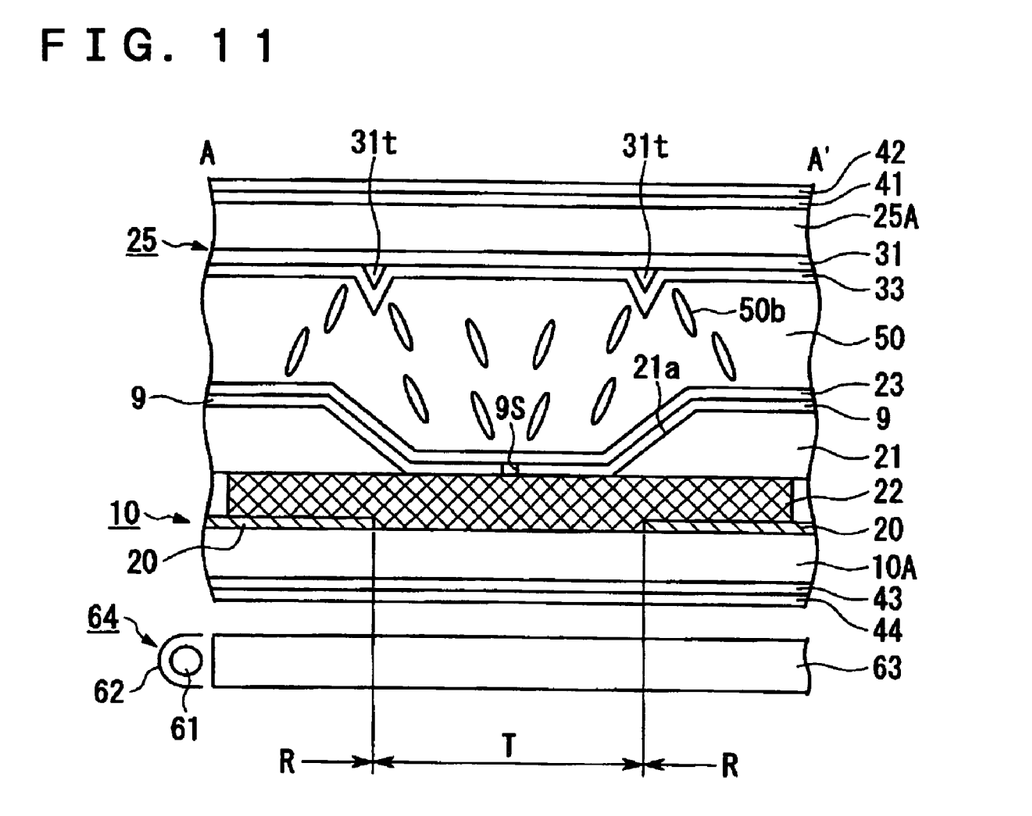
FIG. 11 is a sectional view showing an alternative example of the liquid crystal display device in FIG. 9.

In addition, instead of the opening 31s formed in a common electrode 31 on the side of a counter substrate 25, as shown in FIG. 11, a protrusion 31t projected into a liquid crystal layer 50 from the inner side of the common electrode 31 may be provided. In addition, instead of the opening 9s formed in a pixel electrode 9 on the side of a TFT array substrate 10, a protrusion projected into a liquid crystal layer 50 from the inner side of a pixel electrode 9 may be provided (see FIG. 6). In any case, since the alignment direction of liquid crystal molecule 50b can be controlled by the shape of the protrusion, it is possible to realize the display with no display defects, such as light leakage, and with a high contrast and a wide viewing angle.

Electronic Apparatus

An electronic apparatus including the liquid crystal display device of the above-mentioned exemplary embodiments according to the present invention will be described.

Figure 7:
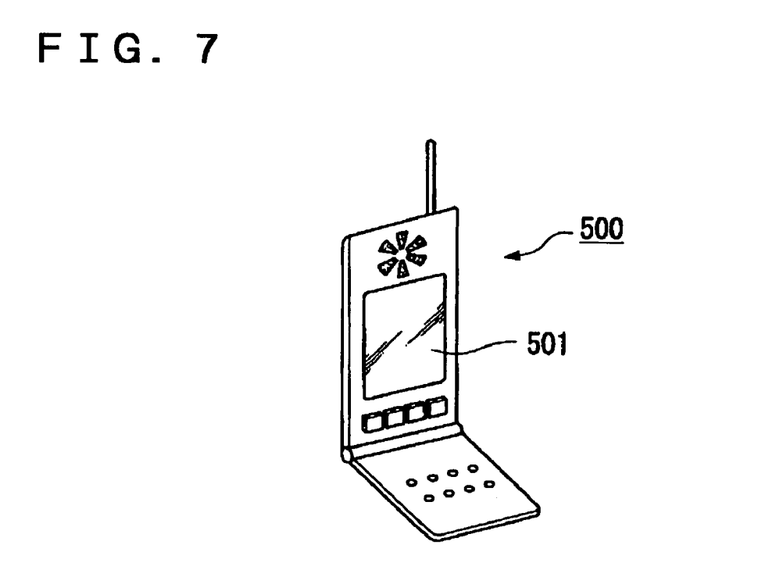
FIG. 7 is a perspective view showing an example of an electronic apparatus according to an aspect of the present invention.

FIG. 7 is a perspective view showing an example of a cellular phone. In FIG. 7, reference numeral 500 denotes a main body of a cellular phone, and reference numeral 501 denotes a display portion using the liquid crystal display device.

Since the electronic apparatus in FIG. 7 includes a display portion using the liquid crystal display device in accordance with the above-mentioned exemplary embodiments, it is possible to realize an electronic apparatus having a liquid crystal display portion with a high brightness, a high contrast, and a wide viewing angle regardless of usage environment.

Furthermore, the present invention is not limited to the above exemplary embodiments, and a number of alternatives, modifications, or alterations to the invention as described herein may be made within the spirit and scope of the present invention. For example, the case where the active matrix liquid crystal display device using a TFT as a switching element is applied to the present invention has been set forth in the above-mentioned exemplary embodiments, but the present invention can be applied to an active matrix liquid crystal display device using a TFD (thin film diode) as a switching element, a passive matrix liquid crystal display device, and so forth. In addition, a detailed description concerning materials, dimensions, shapes, and the like of a variety of components may be changed within an appropriate scope.

What is claimed is:

1. A liquid crystal display device comprising:
   a liquid crystal layer interposed between a pair of substrates and formed of liquid crystal with a negative dielectric anisotropy;
   a dot region;
   a transmissive display region for transmissive display and a reflective display region for reflective display are provided the dot region;
   a thickness-adjusting layer of the liquid crystal layer which makes a thickness of the liquid crystal layer in the reflective display region thinner than a thickness of the liquid crystal layer in transmissive display region, the thickness-adjusting layer of the liquid crystal layer provided at least one of the pair of substrates and having an inclined plane; and
   an electrode provided on the substrate opposite to the side where the thickness-adjusting layer of the liquid crystal layer is provided; and
   a protrusion being provided at a position corresponding to the inclined plane on the electrode;
   the inclined plane is provided in the vicinity of the boundary between the reflective display region and the transmissive display region, the protrusion controlling an alignment direction or the liquid crystal.

2. The liquid crystal display device according to claim 1, further comprising:
   within the single dot region, the transmissive display region being provided in the center of the dot region, the reflective display region being provided at the peripheral edge of the dot region to surround the periphery of the transmissive display region, and, among the electrodes on the pair of substrates, an opening being provided at a position substantially corresponding to the center of the transmissive display region in the electrode on the substrate side where the thickness-adjusting layer of the liquid crystal layer is provided.

3. The liquid crystal display device according to claim 1, further comprising:
   within the single dot region, the transmissive display region being provided in the center of the dot region, the reflective display region being provided at the peripheral edge of the dot region to surround the periphery of the transmissive display region, and, among the electrodes on the pair of substrates, a protrusion being provided at a position substantially corresponding to the center of the transmissive display region in the electrode on the substrate side where the thickness-adjusting layer of the liquid crystal layer is provided.

4. The liquid crystal display device according to claim 1, color filters being provided on the inner side of any one of the pair of substrates.

5. The liquid crystal display device according to claim 1, a substantially circular polarized light incidence device being provided to make substantially circular polarized light incident on each of the pair of substrates.

6. An electronic apparatus, comprising:
a liquid crystal display device according to claim 1.

* * * * *